(12) United States Patent
Hall et al.

(10) Patent No.: US 7,891,453 B2
(45) Date of Patent: Feb. 22, 2011

(54) ENERGY STORAGE IN AN ELASTIC VESSEL

(75) Inventors: David R. Hall, Provo, UT (US); Francis Leany, Salem, UT (US); Jacob Hannon, Payson, UT (US)

(73) Assignee: Schlumberger Technology Corporation, Houston, TX (US)

( * ) Notice: Subject to any disclaimer, the term of this patent is extended or adjusted under 35 U.S.C. 154(b) by 641 days.

(21) Appl. No.: 11/773,561

(22) Filed: Jul. 5, 2007

(65) Prior Publication Data

US 2009/0008171 A1 Jan. 8, 2009

Related U.S. Application Data

(63) Continuation-in-part of application No. 11/772,334, filed on Jul. 2, 2007, now Pat. No. 7,600,376.

(51) Int. Cl.
*B60K 25/10* (2006.01)
*B60K 17/356* (2006.01)
*B60K 7/00* (2006.01)
*B60K 17/14* (2006.01)

(52) U.S. Cl. ........................ 180/165; 180/307; 180/308
(58) Field of Classification Search ................ 180/165, 180/305, 307, 308
See application file for complete search history.

(56) References Cited

U.S. PATENT DOCUMENTS

| 3,215,043 | A | * | 11/1965 | Huber ........................ 418/61.3 |
|---|---|---|---|---|
| 3,661,327 | A | | 5/1972 | Adamson |
| 3,938,841 | A | | 2/1976 | Glance |
| 4,098,083 | A | | 7/1978 | Carman |
| 4,257,499 | A | | 3/1981 | Deschner |
| 4,351,409 | A | * | 9/1982 | Malik .......................... 180/165 |
| 4,479,356 | A | * | 10/1984 | Gill .............................. 60/699 |
| 4,616,392 | A | | 10/1986 | Snyder |
| 4,784,362 | A | | 11/1988 | Wang |
| 4,848,210 | A | * | 7/1989 | Bissonnette .................. 89/1.81 |
| 5,088,041 | A | * | 2/1992 | Tanaka et al. ................. 701/70 |
| 5,254,243 | A | | 10/1993 | Carr |
| 5,263,401 | A | | 11/1993 | Walker |
| 5,509,938 | A | | 4/1996 | Phillips |
| 5,511,759 | A | | 4/1996 | DeKraker |

(Continued)

OTHER PUBLICATIONS

DuPont™ Kevlar® Products—web print at http://www2.dupont.com/Kevlar/_en_US/products/index.html, Sep. 1, 2010, 3 pages.

(Continued)

*Primary Examiner*—J. Allen Shriver, II
*Assistant Examiner*—John R Olszewski
(74) *Attorney, Agent, or Firm*—Holme Roberts & Owen LLP

(57) ABSTRACT

In one aspect of the present invention, an energy storage system has an elastic hydraulic fluid vessel with an internal variable volume and being coupled to a hydraulic rotary mechanism. The elastic hydraulic fluid vessel has an elastic material adapted to store a potential energy within its fibers when the internal volume is increased by a hydraulic fluid. The hydraulic rotary mechanism is adapted to be accelerated by the release of the potential energy of the fibers of the elastic vessel by ejecting the hydraulic fluid from the internal variable volume into the rotary mechanism.

31 Claims, 16 Drawing Sheets

U.S. PATENT DOCUMENTS

| | | |
|---|---|---|
| 5,579,640 A | 12/1996 | Gray |
| 6,146,114 A * | 11/2000 | Nardacci et al. ............ 417/437 |
| 6,296,299 B1 | 10/2001 | Hanakawa et al. |
| 6,468,315 B1 | 10/2002 | Wilkinson |
| 7,100,895 B2 * | 9/2006 | Schurz et al. ............ 251/335.3 |
| 7,669,679 B2 * | 3/2010 | Rastegar et al. ............ 180/165 |
| 2004/0173396 A1 | 9/2004 | Rush |
| 2004/0173412 A1 * | 9/2004 | Birbaumer et al. .......... 187/285 |

OTHER PUBLICATIONS

Teijin Aramid :: Twaron—web print at http://www.teijinaramid.com/smartside.dws?id=20090, Sep. 1, 2010, 2 pages.

* cited by examiner

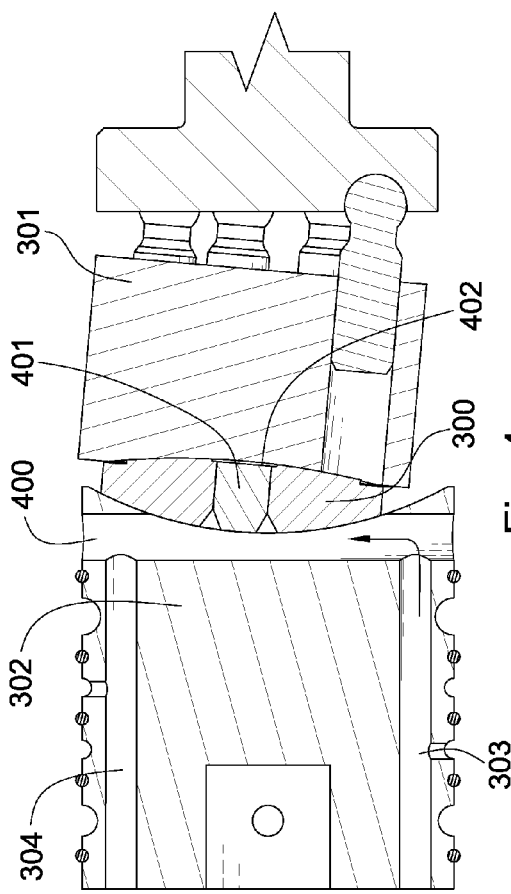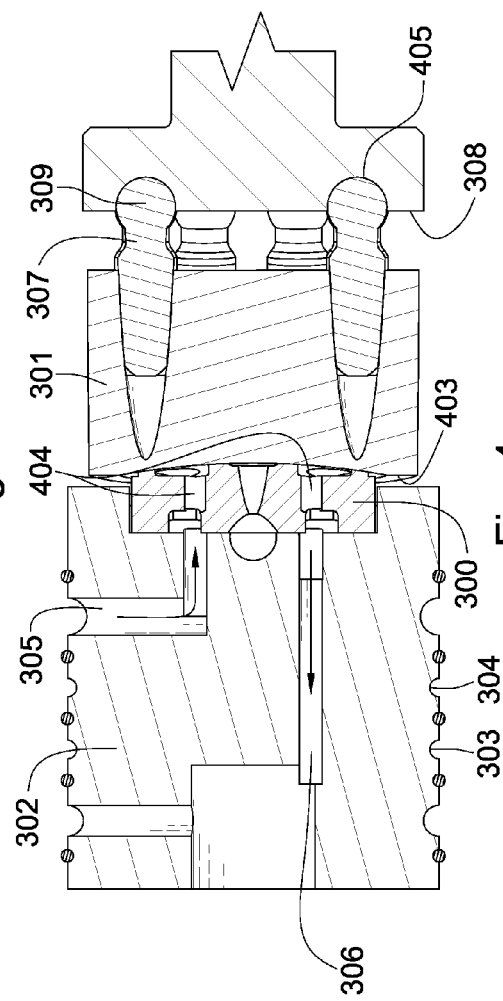
Fig. 4
Fig. 4a

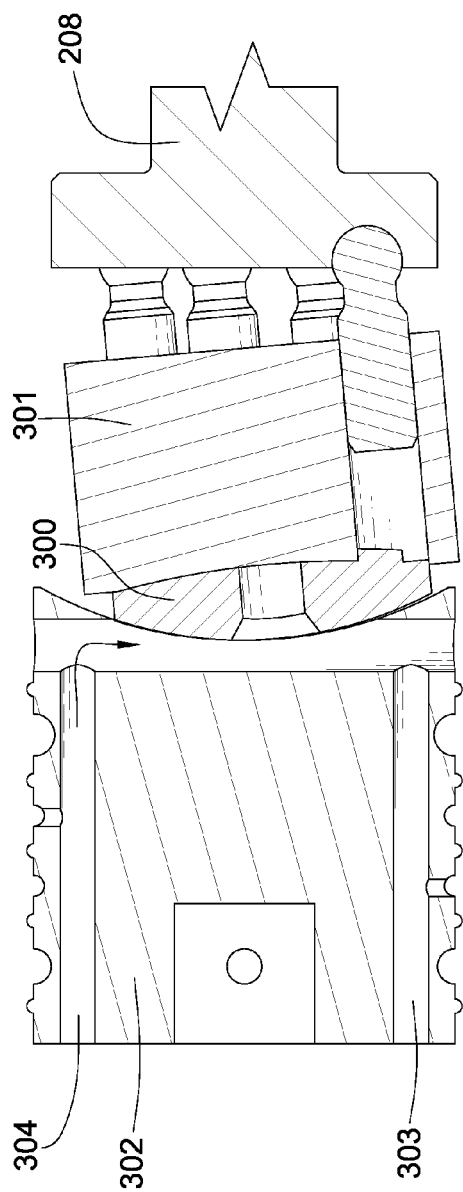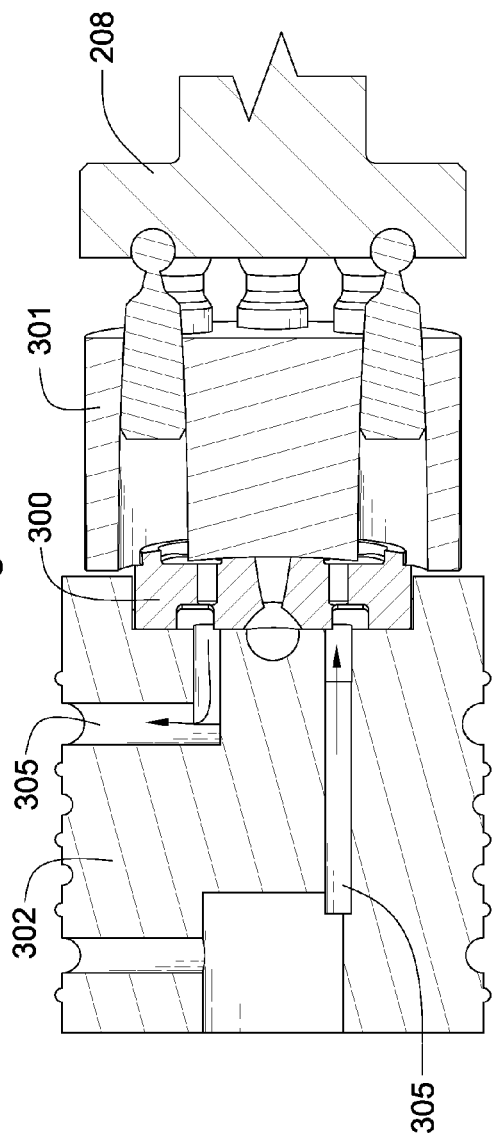

1000

Provide an elastomeric fluid vessel coupled to the translatable vehicle, the elastomeric vessel comprising stored potential energy in a form of pressurized fluid expanding a volume of the elastomeric vessel; the vessel also being in fluid communication with a rotary mechanism adapted to control a rotational speed of a portion of at least one translation element of the vehicle    1002

Rotate the portion of the at least one translation element by ejecting pressurized fluid into the rotary mechanism from the elastomeric fluid vessel    1004

Fig. 21

ENERGY STORAGE IN AN ELASTIC VESSEL

CROSS REFERENCE TO RELATED APPLICATIONS

This application is a continuation-in-part of U.S. patent application Ser. No. 11/772,334 which was filed on Jul. 2, 2007, now U.S. Pat. No. 7,600,376. This application is incorporated by reference herein for all it discloses.

BACKGROUND OF THE INVENTION

Modern hybrid vehicles may use either various forms of energy in addition to combustion engines for additional power and energy storage. The most well know hybrid cars are electronic hybrids that incorporate batteries which store electrical energy. Energy wasted during braking may be converted into electrical power and stored in these batteries, which then may be used to when the hybrid car is accelerating. Such hybrids are commercially available and generally get better gas mileage than cars of generally the same weight and horsepower.

Also known in the patent art are hydraulic hybrids which operate on a similar concept to the electrical hybrids. An example of a hydraulic hybrid is disclosed in U.S. Pat. No. 4,098,083 to Carman, which is herein incorporated by reference for all that it contains. The patent discloses a hydraulic multi-speed, multi-torque transmission system for vehicles for storing and converting energy resulting from braking of the vehicle, such transmission utilizing multiple fixed displacement hydraulic pump-motors coupled to the vehicle wheels and a fixed displacement pump driven by the engine. Carman discloses that the accumulators are used to store hydraulic energy. These accumulators use compressible gas to store the potential energy of the hydraulic system and to force to the hydraulic fluid into pump-motors.

Another type of hybrid described in the patent art is disclosed in U.S. Pat. No. 4,479,356 to Gill, which is herein incorporated by reference for all that it contains. It discloses an energy recovery system for a machine, and particularly an automotive vehicle, which includes an energy storage device which selectively receives energy from the prime mover for storage via a predetermined path and delivers stored energy to the prime mover load via the same path. In the preferred embodiment the energy storage device is an elastomeric tube which is disposed for rotational movement about a shaft and secured at the ends to respective end members. Braking units permit selective braking and releasing of the end members relative to fixed supports. A set of planet gears are controlled by the brake actuation to drive a sun gear to be driven by a ring gear to effect energy inflow and outflow, respectively, from the elastomeric tube. The storage device is permitted to store energy or release its stored energy as a function of vehicle control and operational parameters.

BRIEF SUMMARY OF THE INVENTION

In one aspect of the present invention, an energy storage system has an elastic hydraulic fluid vessel with an internal variable volume and being coupled to a hydraulic rotary mechanism. The elastic hydraulic fluid vessel has an elastic material adapted to store a potential energy within its fibers when the internal volume is increased by a hydraulic fluid. The hydraulic rotary mechanism is adapted to be accelerated by the release of the potential energy of the fibers of the elastic vessel by ejecting the hydraulic fluid from the internal variable volume into the rotary mechanism.

In some embodiments, the hydraulic rotary mechanism inflates the elastic fluid vessel. The vessel may be bladder, a hose, or a combination thereof. The elastic material may a composite material, Kevlar, polyurethane, polyethylene, Twaron, aramid fiber, nylon, rubber, carbon, synthetic polymers, chloroprene, or a combination thereof. The elastic material may be a woven fiber or the material may comprise a plurality of strips. In some embodiments, the elastic vessel is inflatable to over 1,000 psi; in other embodiments, the vessel is inflatable to over 5,000 psi.

An actuator may be adapted to increase the pressure within the vessel, such as an expandable element positioned within the vessel. In some embodiments, a rigid element may be disposed within the elastic vessel. The rigid element may comprise a low pressure hydraulic volume or fluid conduit.

The rotary mechanism may comprise a hydraulic motor. The hydraulic motor may comprise a cam shaft, turbine, lobed rotor, or a combination thereof. The rotary mechanism may comprise a pump, such as a variable displacement pump. The present invention may incorporate non-compressible hydraulic fluid, compressible hydraulic fluid, or a combination thereof.

In another aspect of the present invention, an energy storage system for a translatable vehicle has an elastic fluid vessel coupled to the translatable vehicle. The elastic vessel has stored potential energy in a form of pressurized fluid expanding a volume of the elastic vessel. The vessel is in fluid communication with a rotary mechanism adapted to rotate at least one translation assembly of the vehicle, wherein when the pressurized fluid is released from the vessel by ejecting the pressurized fluid into the rotary mechanism, the potential energy is converted into kinetic energy and adapted to rotate a portion of the translation assembly.

The translatable vehicle may be a car, truck, bicycle, motorcycle, 3-wheeler, 4-wheeler, golf cart, backhoe, bulldozer, construction machinery or a combination thereof. The elastic vessel may be a hose, a bladder or combinations thereof. In some embodiments, the hose may be incorporated into a rigid frame of the vehicle. In some embodiments, a rigid element may be disposed within the elastic vessel. In some embodiments, the vessel may be at least part of a frame of the vehicle. The elastic vessel may be made of a composite material, Kevlar, polyurethane, polyethylene, Twaron, aramid fiber, nylon, rubber, or a combination thereof.

The vehicle may comprise a pump adapted to pressurize the elastic vessel. The translation assembly may be adapted to pump fluid into the vessel. Each translation assembly may be associated with an independent mechanical transmission. The rotary mechanism may comprise a hydraulic motor. The rotary mechanism may comprise a pump. The pump may be a variable displacement pump. The rotary mechanism may comprise a mechanical transmission.

In another aspect of the present invention, a method for propelling a translatable vehicle comprises providing an elastic fluid vessel coupled to the translatable vehicle, the elastic vessel comprising stored potential energy in a form of pressurized fluid expanding a volume of the elastic vessel; the vessel also being in fluid communication with a rotary mechanism adapted to control a rotational speed of a portion of at least one translation assembly of the vehicle; and rotating the portion of the at least one translation assembly by ejecting pressurized fluid into the rotary mechanism from the elastic fluid vessel.

The method may further include the step of automatically roll-starting an engine of the vehicle while the portion of the at least one translation assembly is rotating. The method may further include the step of automatically turning off the engine while the rotational speed of the portion of the translation assembly decelerates. The pressurized fluid may be used to cool the engine. The elastic vessel may be re-pressurized during braking.

BRIEF DESCRIPTION OF THE DRAWINGS

FIG. 4 is a cross-sectional diagram of another embodiment of a variable displacement pump.

FIG. 4a is another cross-sectional diagram of the embodiment of FIG. 4.

FIG. 5 is a cross-sectional diagram of another embodiment of a variable displacement pump.

FIG. 5a is another cross-sectional diagram of the embodiment of FIG. 5.

FIG. 21 is a flowchart diagram of a method for use in propelling a translatable vehicle.

DETAILED DESCRIPTION OF THE INVENTION AND THE PREFERRED EMBODIMENT

Figure 1:
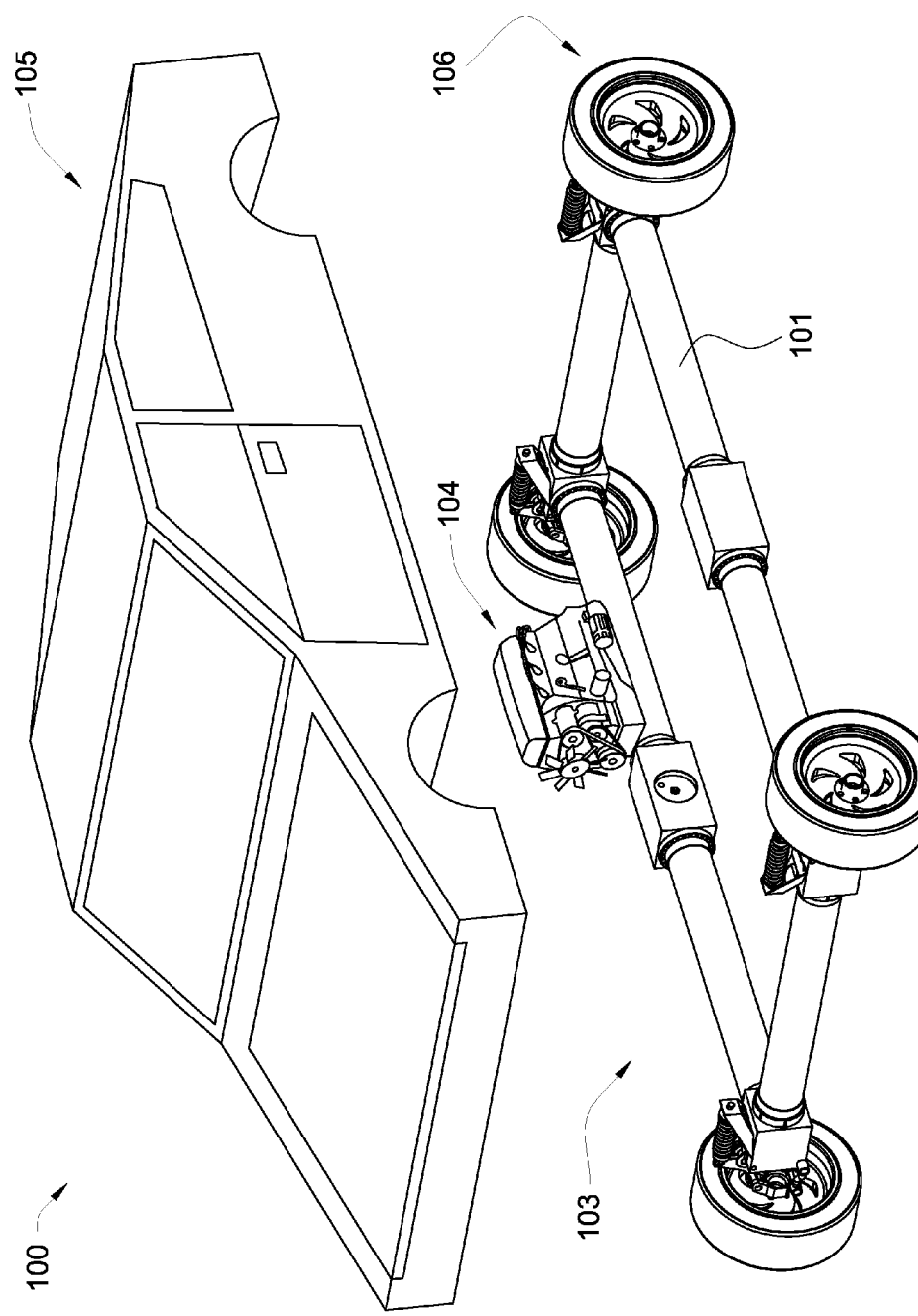
FIG. 1 is an exploded diagram of an embodiment of a translatable vehicle comprising an energy storage system.

Referring to the exploded diagram in FIG. 1, a translatable vehicle 100 comprises an energy storage system adapted to store hydraulic energy to be used in propelling the vehicle 100. Unlike typical bladder accumulators of the prior art which rely on a compressible gas to store potential energy, the potential energy of the present invention is stored in the elastic material making up at least a portion of an elastic vessel 101, such as a stretchable sidewall, that is coupled to the vehicle 100. Hydraulic fluid stored in the elastic vessel may be a compressible fluid, an incompressible fluid or a combination thereof. In some embodiments, for example, compressible fluid may also provide storage for some of the potential energy. In some embodiments, the compressible fluid may store at least 10 percent of the stored energy, while in other embodiments, the compressible fluid can store at least 25 percent of the stored energy.

In the embodiment illustrated in FIG. 1, the elastic vessel 101 is a plurality of hoses making up at least a part of the vehicle frame 103. The vessel 101 may comprise a strong, flexible material, or stretchable sidewall, capable of withstanding high amounts of pressure. In some embodiments, the pressure may be between 1,000 psi to 50,000 psi; in other embodiments, the pressure is between 10,000 to 20,000 psi. Additionally, the elastic material forming the stretchable sidewall of the vessel 101 may be a composite material, polyurethane, polyethylene, para-aramid fiber such as KEVLAR® or TWARON®, aramid fiber, nylon, rubber, carbon, synthetic polymers, chloroprene, elastomers, polyester, carbon fiber, glass fiber, or a combination thereof. The material forming the stretchable sidewall may be a woven fiber, a plurality of strips, or a combination thereof. At high pressure, the stretchable sidewall of the elastic vessel 101 may also stiffen the frame 103.

The vehicle 100 may comprise an engine 104 connected to the frame 103. The engine 104 may be a small, efficient engine to reduce size and weight, thus saving gas per mile. The vehicle 100 may also comprise a cab 105 attached to the frame 103. Energy conversion devices or translation assemblies 106 such as wheels may be connected to the frame 103.

The elastic vessel 101 is adapted to receive hydraulic fluid and stores energy in the form of potential energy. The potential energy is stored in the material of the elastic vessel 101 as its volume expands due to receiving hydraulic fluid. The potential energy stored in the vessel 101 may be converted into kinetic energy by ejecting the fluid from the vessel 101 into a rotary mechanism, which may then apply torque to at least a portion of the translation assembly 106.

Figure 2:
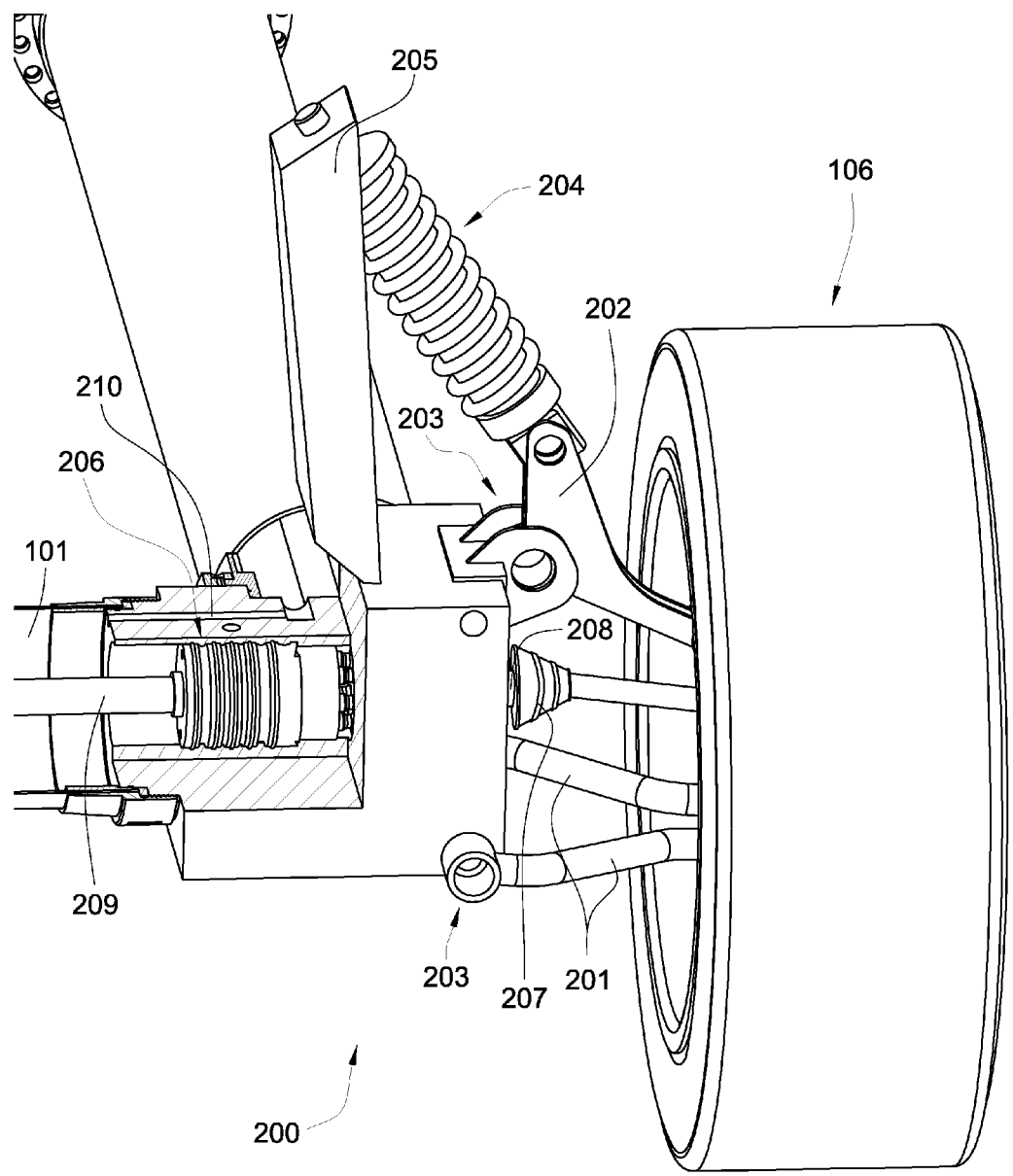
FIG. 2 is a sectional diagram of an embodiment of a corner manifold of a car frame.
Figure 3:
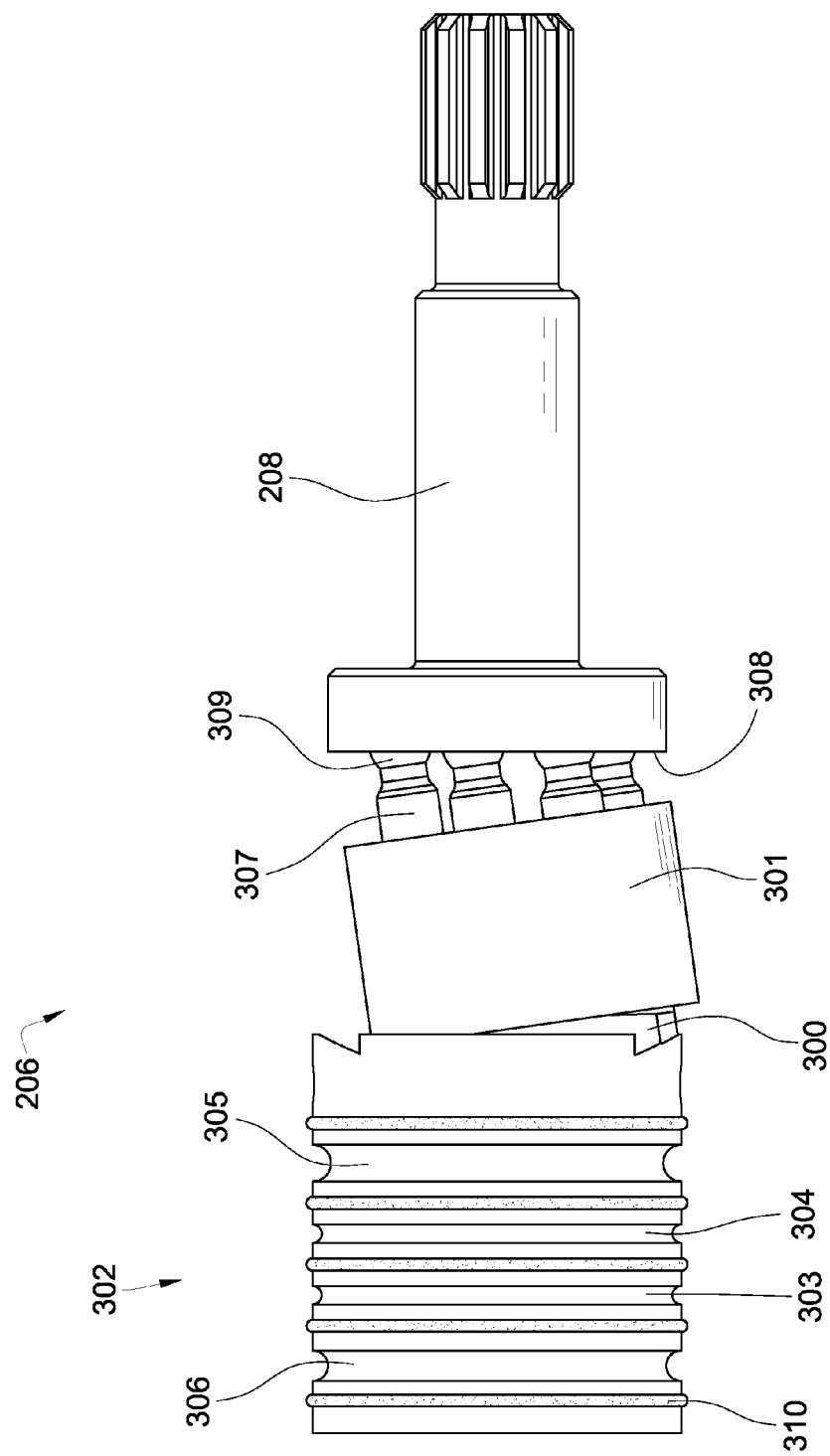
FIG. 3 is an orthogonal diagram of an embodiment of a variable displacement pump.

Each energy conversion device or translation assembly 106 may be connected to a manifold 200 at each corner of the vehicle, as in the embodiment of FIG. 2. The translation assembly 106 may be connected to the manifold 200 by a plurality of lower arms 201 and an upper arm 202 rotatably connected to hinges 203 on the manifold 200. The manifold 200 may comprise a strut 204 rotatably connected to the upper arm 202 and affixed to a mount 205 on the manifold 200 (though the strut and mount are shown elevated so that the cross-section of the manifold may be seen). The strut 204 may allow for the frame 103 to provide impact shock absorption to the vehicle 100 on uneven surfaces. The corner manifold 200 may comprise a rotary mechanism 206 such as a pump or a motor such that hydraulic fluid may be used to apply a rotational torque to the translation assembly 106 or a portion of the translation assembly 106. A joint 207 such as a CV joint may join the translation assembly 106 to a shaft 208 attached to the rotary mechanism 206 such that the energy storage system may be able to transmit rotational power to the translation assembly 106 at various angles, which may be especially useful on uneven surfaces.

A rigid element 209 may be disposed within the elastic vessel 101. The rigid element 209 may be a fluid conduit wherein a low pressure hydraulic fluid may be allowed to circulate through the rigid element 209 while a high pressure hydraulic fluid may be allowed to circulate through the elastic vessel 101 at the same time. The high and low pressure fluids may be used to control the rotation of the translation assembly 106. The vessel 101 and fluid conduit 209 may be in fluid communication with each other through a fluid passageway 210 formed in the manifold 200 which can provide access to various annular channels formed into the outer surface of the rotary mechanism 206.

Referring also to FIGS. 3 through 6, the rotary mechanism 206 may be a variable displacement pump such that the amount of torque applied to rotate the translation assembly 106 may be varied. One such rotary mechanism which may be used is a variable displacement motor, part number A6VM28, from Bosch-Rexroth Corp., located at 13766 Alton Parkway Suite 147, Irvine, Calif. 92618. In other embodiments, the rotary mechanism may be a pump, motor, or combination thereof adapted to convert hydraulic energy into rotational energy to be applied to the translation assembly 106. The rotary mechanism 206 may comprise a swashplate 300 (shown in more detail in FIG. 5) intermediate a piston barrel 301 and a cylindrical component 302 comprising a plurality of annular channels 303, 304, 305, 306, which may extend into the cylindrical component 302, adapted to direct the flow of high and low pressure fluids. Each channel may be sealed off from the others by o-rings 310 intermediate the channels 303, 304, 305, 306. The piston barrel 301 comprises a plurality of pistons 307, preferably an odd number, disposed within the piston barrel 301, with ends 309 of the pistons 307 at least partially disposed within a face 308 of the shaft 208.

The swashplate 300 may be controlled by high and low pressure fluids from first and second annular channels 303, 304 connected by a channel 400 that substantially runs vertically proximate the swashplate, depending on the direction of flow of high pressure fluid against a protruding member 401 within a central bore 402 in the swashplate 300. The rotary mechanism 206 may be designed such that varying the position of the swashplate 300 up or down against the cylindrical component 302 also changes the angle of the piston barrel 301. High pressure in the first channel 303 from below the protruding member 401, with low pressure in the second channel 304 from above the protruding member 401, may cause the swashplate to be moved to an up position as in the embodiment of FIG. 4.

The cylindrical component 302 may also comprise third and fourth annular channels 305, 306, as in the embodiment of FIG. 4a. The third channel 305 may comprise a high pressure hydraulic fluid, and the fourth channel 306 may comprise a low pressure hydraulic fluid. The fluid from each channel 305, 306 may be exposed to a face 403 of the piston barrel 301 through slots 404 in the swashplate 300. When the swashplate 300 is in a position other than neutral, the high pressure fluid may cause some of the pistons 307 to extend from the piston barrel 301, the piston ends 309 maintaining contact with recesses 405 in the shaft face 308. The high pressure fluid may also cause the piston barrel 301 to rotate. The shaft 208 may rotate accordingly with the piston barrel 301 and causes the translation assembly 106 to rotate. The recesses 405 in the shaft face 308 may comprise bearing surfaces to reduce friction due to contact with the piston ends 309. The amount of torque applied to the rotation of the translation assembly 106 may be increased or decreased by moving the swashplate 300 farther from or closer to a neutral position on the cylindrical component 302. A higher amount of torque may be desirable for propelling the vehicle 100 from a stopped position, while a lower amount of torque may be desirable while the vehicle 100 is already in motion. The vehicle 100 may be allowed to coast when the swashplate 300 is in the neutral position. The first channel 303 may or may not be isolated from the third channel 305, and the second channel 304 may or may not be isolated from the fourth channel 306. The amount of fluid through each channel may be controlled by a plurality of valves, which may be attached to the manifold 200.

When the swashplate 300 and piston barrel 301 are in the up position and the energy storage system is propelling the vehicle 100, fluid may be exchanged from the high pressure channel 305 to the low pressure channel 306. The energy storage system may be used to start an engine 104 at a moment before the hydraulic fluid in the high pressure channel 305 is depleted or drops below a predetermined pressure. The engine 104 may be used to propel the vehicle 100 or repressurize the high pressure channel 305. The high pressure channel 305 may also be repressurized through regenerative braking. When the brakes are applied, the swashplate 300 may move toward a down position against the cylindrical component 302, as in the embodiment of FIG. 5. Due to the momentum of the vehicle 100 already in motion, the shaft 208 and piston barrel 301 may already be rotating in one direction, while the high pressure fluid may oppose the motion of the shaft 208 and barrel 301, slowing their rotation. During the braking process, fluid may also be transferred from the low pressure channel 306 to the high pressure channel 305, thereby repressurizing the high pressure channel 305 at least in part, as in the embodiment of FIG. 5a. The vehicle 100 may comprise electronics such as logic and sensors to accurately control the swashplate and to monitor the hydraulic pressure in the energy storage system.

Figure 6:
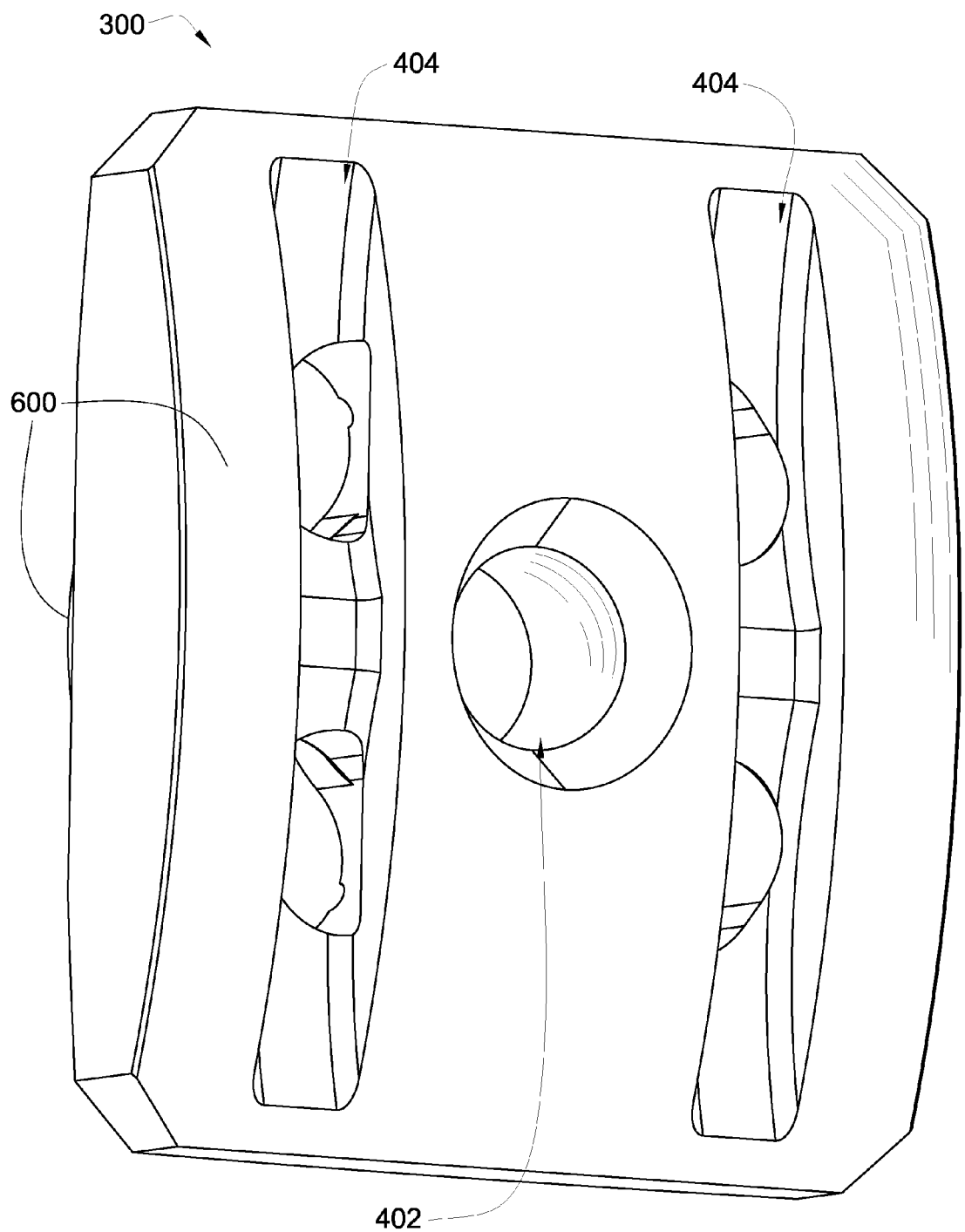
FIG. 6 is a perspective diagram of an embodiment of a swashplate.

The swashplate 300, seen in greater detail in the embodiment of FIG. 6, may comprise bearing surfaces 600 such that friction and/or wear may be reduced while the piston barrel 301 rotates or when the swashplate 300 slides against the cylindrical component 302.

Figure 7:
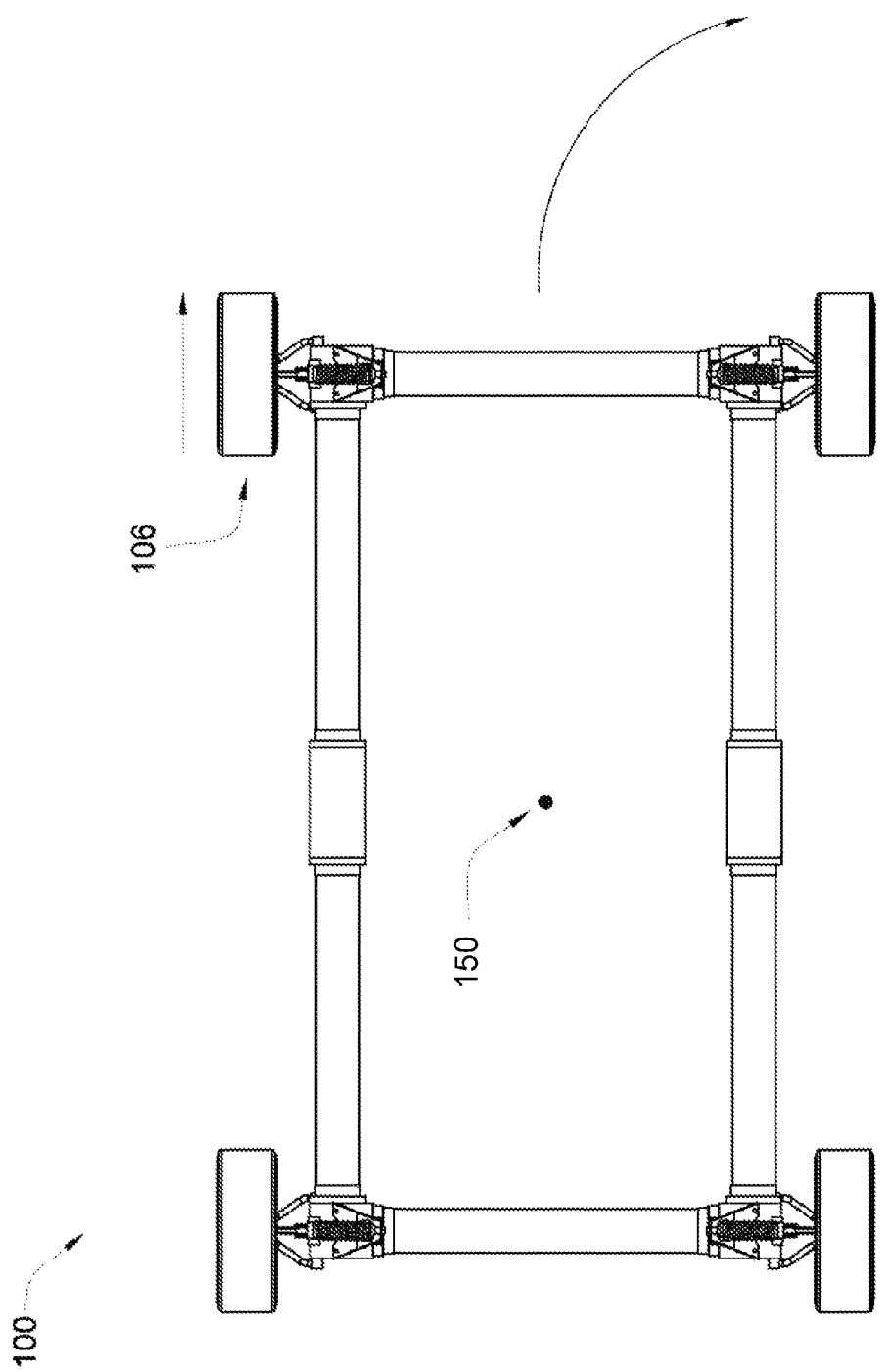
FIG. 7 is an orthogonal diagram of an embodiment of a car frame.
Figure 8:
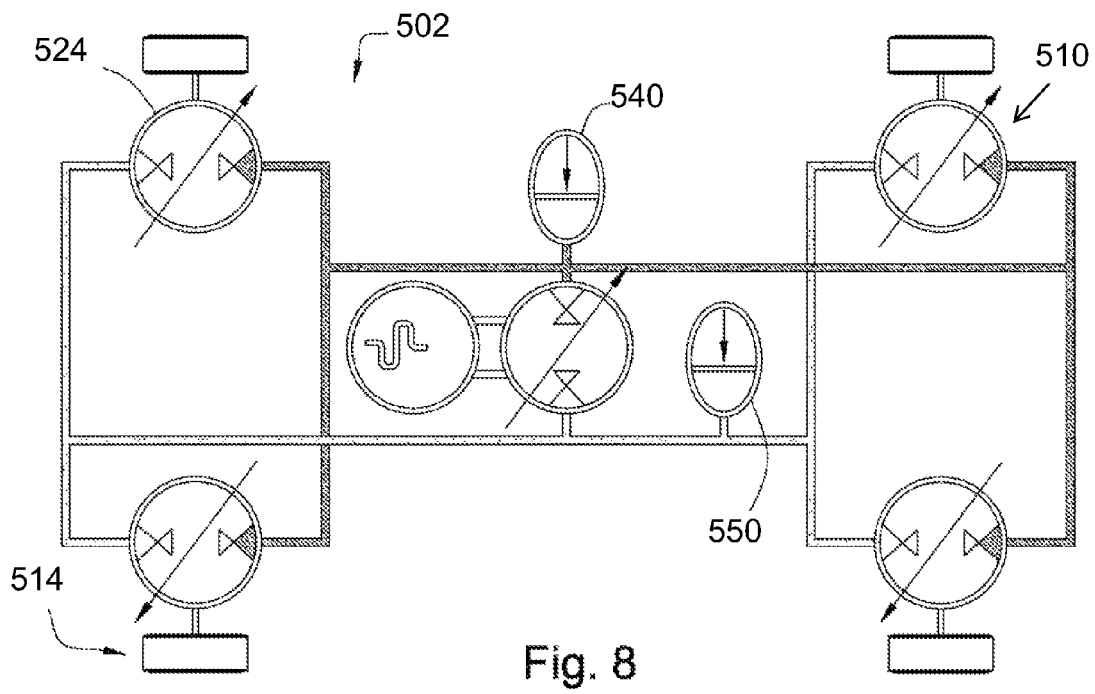
FIG. 8 is a hydraulic circuit diagram of an embodiment of an energy storage system.

Each translation assembly may be associated with an independent mechanical transmission which may allow for translation assemblies 106 to be propelled at different rates which causes the vehicle to turn, as in the embodiment of FIG. 7. This system may also be used to turn the vehicle 100 at a very high rate or to rotate the vehicle about a central point 150 by reversing the translation assemblies 106 on one side of the vehicle 100 while the other translation assemblies 106 move forward. In embodiments where the independent mechanical transmission is a rotary mechanism 206, the direction and speed of each translation assembly 106 may be controlled by the position of the swashplate.

FIGS. 8 through 11 disclose various hydraulic schematics for the energy storage system in which the elastic vessel 540 may be in hydraulic communication with a plurality of rotary mechanisms 524. The energy storage system may propel the vehicle forward using the rotary mechanisms 524 at each translation assembly 514, as in the schematic 502 of FIG. 8, especially for propelling the vehicle 510 from rest. A low pressure fluid source 550 or reservoir may also be in hydraulic communication with the rotary mechanisms 526. Extra fluid may be stored in either the elastic vessel 540 or the low pressure fluid source 550.

Figure 9:
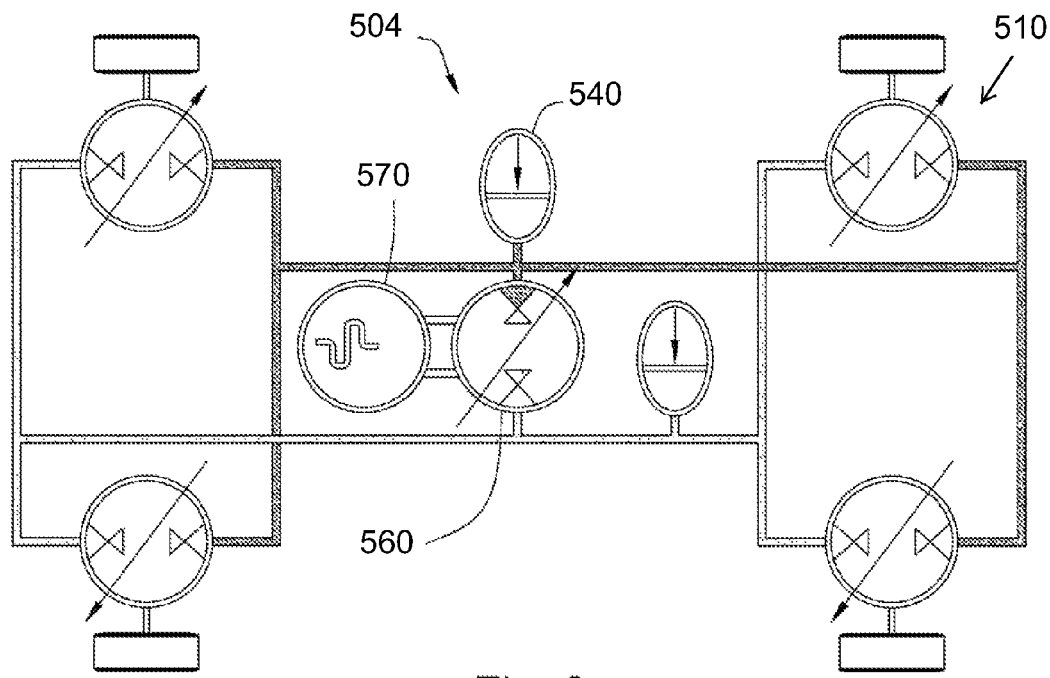
FIG. 9 is a hydraulic circuit diagram of another embodiment of an energy storage system.

The energy storage system may comprise an engine pump 560 adapted to start an engine 570 after the vehicle is already in motion, as in the schematic 504 of FIG. 9. Once the vehicle 510 reaches a predetermined velocity or the elastic vessel 540 falls below a predetermined pressure, the engine pump 560 may begin to draw fluid from the elastic vessel 540 to start the engine 570. Once started, the engine 570 may be used to repressurize the elastic vessel 540 such that the system may continue to propel the vehicle 510.

Figure 10:
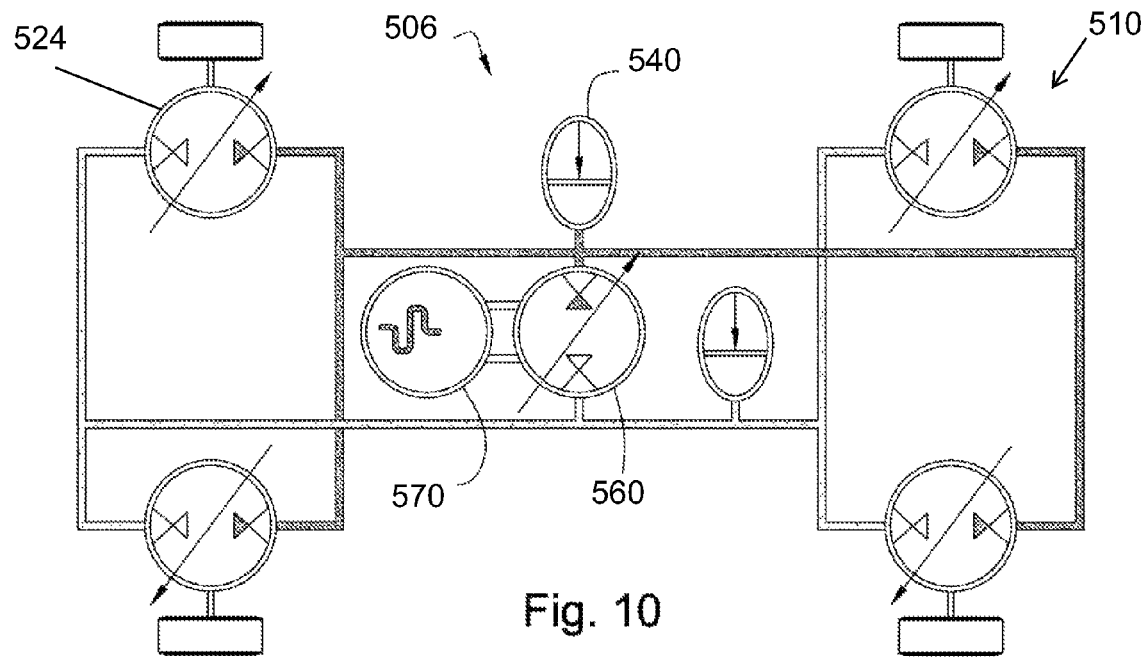
FIG. 10 is a hydraulic circuit diagram of another embodiment of an energy storage system.

Now referring to the schematic 506 illustrated in FIG. 10, the energy storage system may be used to power the vehicle 510 in reverse. The swashplate in each rotary mechanism 524 may be positioned to reverse and the vehicle 510 may be propelled in reverse.

Figure 11:
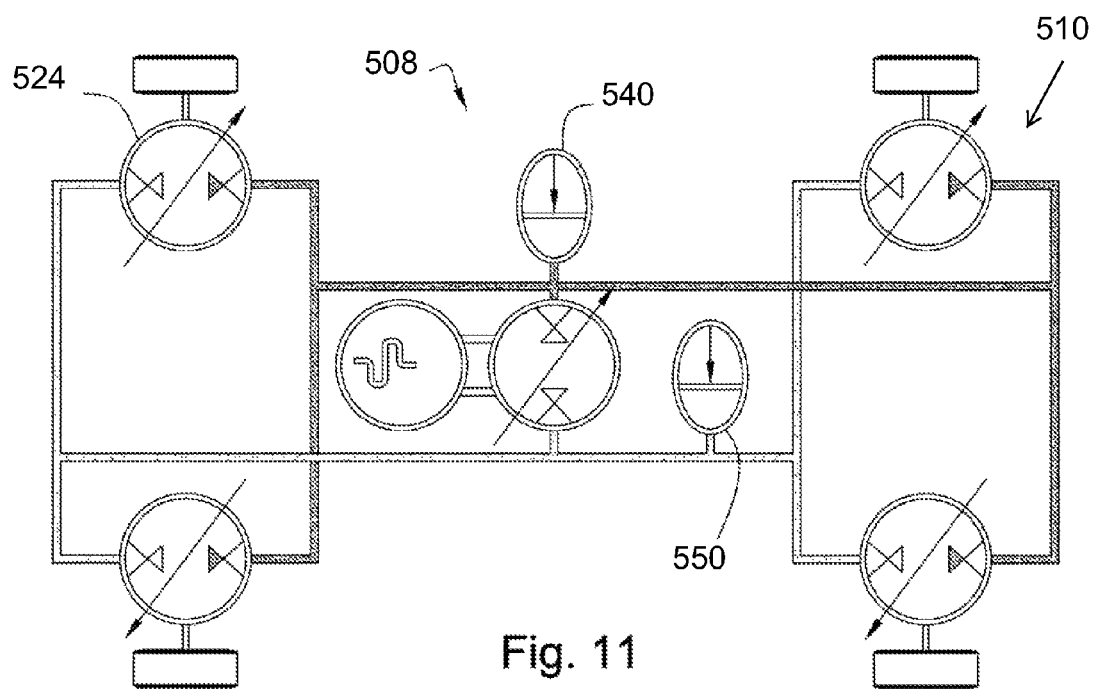
FIG. 11 is a hydraulic circuit diagram of another embodiment of an energy storage system.

The schematic 508 of FIG. 11 discloses regenerative braking. When the vehicle 510 is moving in a forward motion and brakes are applied, the swashplate in each rotary mechanism 524 may move below the neutral position such that high pressure fluid from the elastic vessel 540 opposes the rotation of the piston barrel. Due to the forward rotation of the barrel, at least some fluid is exchanged from the low pressure reservoir or fluid source 550 to the elastic vessel 540. This may allow for the elastic vessel 540 to recover at least a portion of the pressure transferred from the vessel 540 to the low pressure reservoir or fluid source 550 resulting from propelling the vehicle 510 forward. Likewise, the same principle may apply when braking while the vehicle is moving in reverse.

Figure 12:
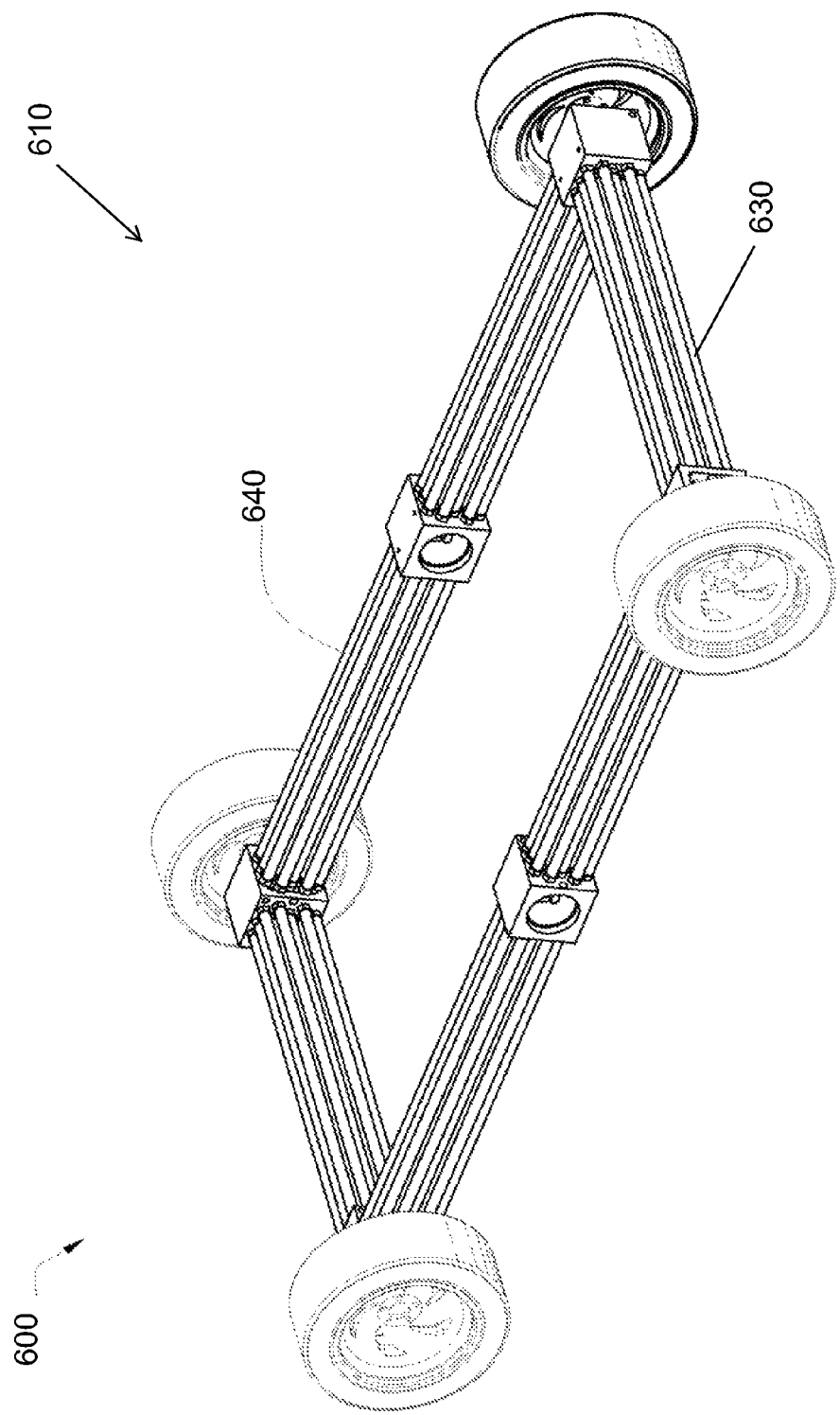
FIG. 12 is a perspective diagram of another embodiment of a car frame.

Referring to the embodiment of FIG. 12, the energy storage system 600 may comprise a plurality of hoses 640 running generally parallel to one another to form the frame 630 of the vehicle 610. The plurality of hoses 640 may be spaced apart to allow for efficient cooling of the hydraulic fluid in the hoses.

Figure 13:
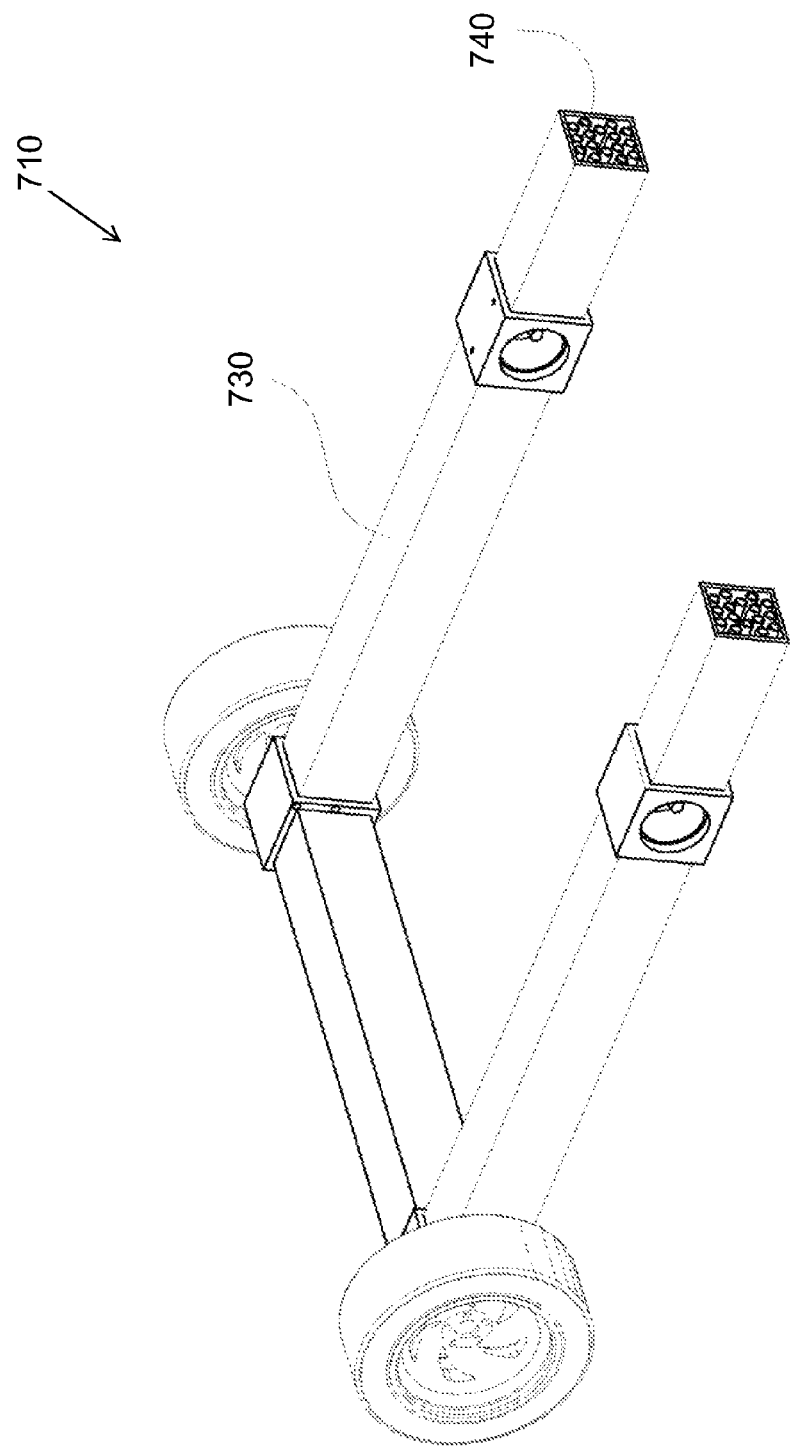
FIG. 13 is a cross-sectional diagram of another embodiment of a car frame.
Figure 14:
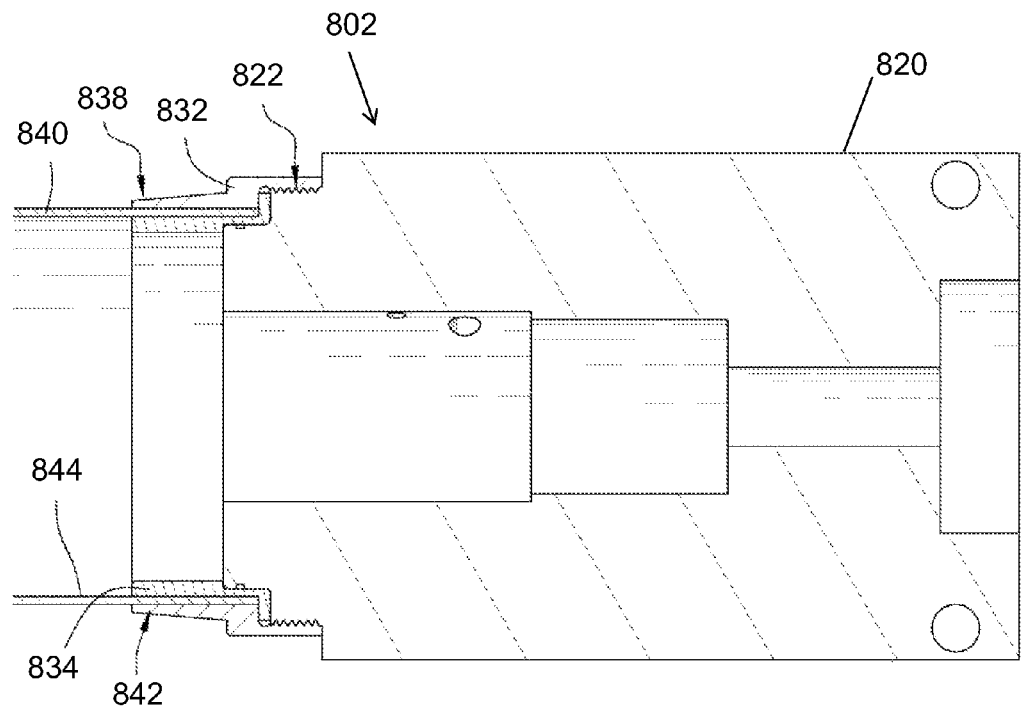
FIG. 14 is a cross-sectional diagram of an embodiment of a hose connection with a corner manifold.

Referring to FIG. 13, the elastic vessel 740 or vessels may be disposed within a rigid frame 730 of the vehicle 710. In some embodiments, the frame is made of a hard material such as steel. The rigid frame 730 may provide structural strength to the vehicle 710. A coolant may be disposed within the rigid frame and surrounding the one or more elastic vessels 740 for maintaining the energy storage system at low operating temperatures. In some embodiments, the rigid frame also limits the amount that the hoses may expand, thereby limiting their fatigue.

The elastic vessel 840 may be connected to the manifolds 820 in such a way as to prevent leaking. Several different embodiments are shown in FIGS. 14 through 17. For example, each vessel 840 may be connected to the manifold 820 by a threaded connection, as in the embodiment 802 of FIG. 14. An exterior threaded metal ring 832 may be disposed around an end 842 of the vessel 840 and a second metal ring 834 may be inserted in an inner diameter 844 of the vessel 840 such that when the exterior threaded metal ring 832 is connected to a threaded portion 822 of the manifold 820, the two metal rings 832, 834 may grip the vessel end 842 and create a sealed connection. The metal rings 832, 834 may comprise a tapered thickness 838. This may reduce pinching on the vessel 840, particularly when the vessel is radially stretched.

Figure 15:
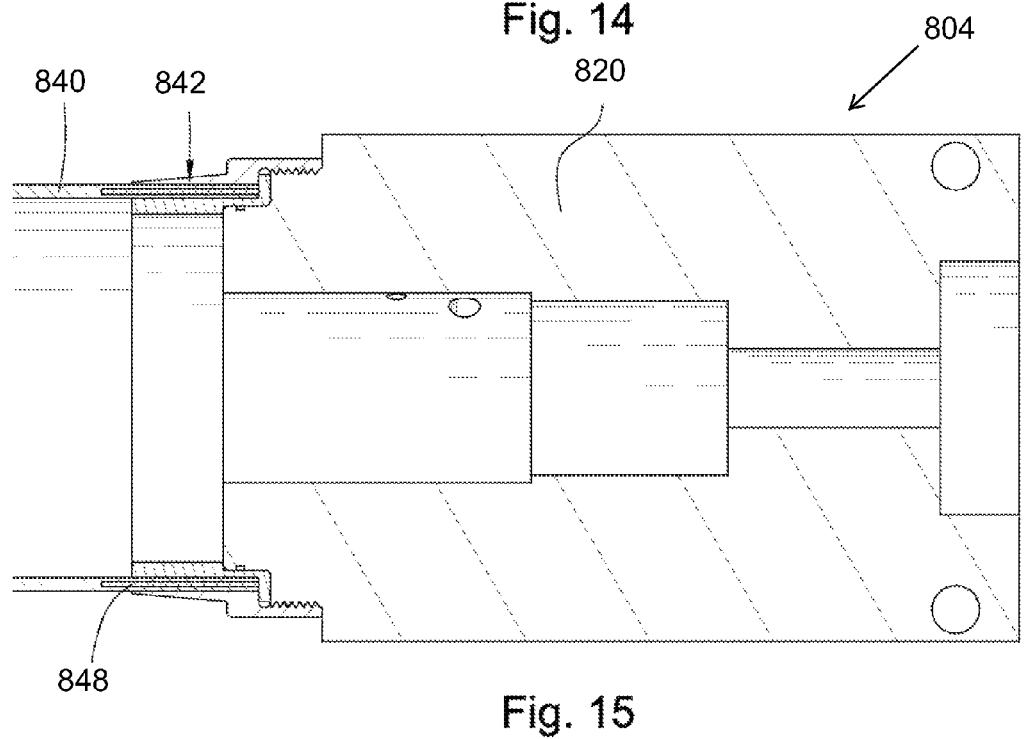
FIG. 15 is a cross-sectional diagram of another embodiment of a hose connection with a corner manifold.
Figure 16:
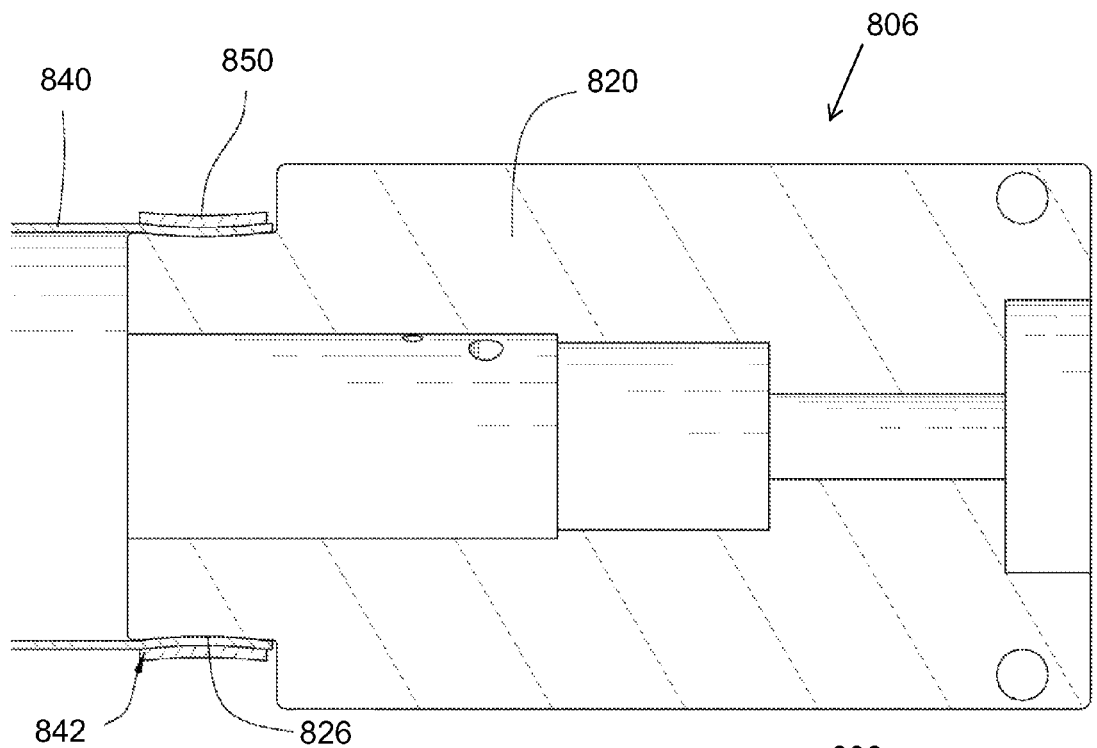
FIG. 16 is a cross-sectional diagram of another embodiment of a hose connection with a corner manifold.

The vessel 840 may include metal strips or pins 848 disposed within the end 842, which may improve the material integrity of the vessel 840 proximate the connection, as in the embodiment of FIG. 15. Alternatively, the vessel end 842 may also be clamped onto the manifold 820 by a band 850, as in the embodiment 806 of the energy storage system illustrated in FIG. 16. Moreover, the manifold 820 may comprise a radial depression 826 at the connection, which may prevent the band 850 from sliding. The band 850 may be a metal heat shrink band.

Figure 17:
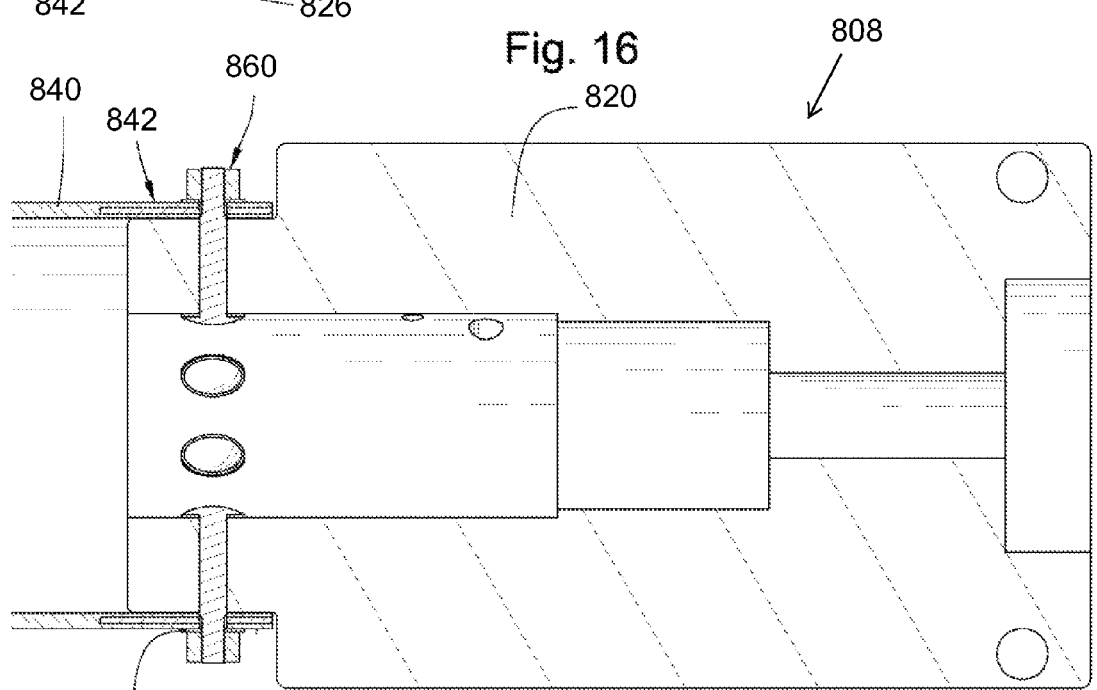
FIG. 17 is a cross-sectional diagram of another embodiment of a hose connection with a corner manifold.

The vessel 840 may be connected to the manifold 820 with a plurality of fasteners 860 such as bolts, as in the embodiment 808 of FIG. 17. A metal ring 862 may be disposed around the outer diameter of the vessel end 842, which may provide additional support to the vessel 840 where the fasteners 860 are positioned. In some embodiments, the elastic modulus of the elastic vessel may vary depending on the location of the vessel. For example, it may be desirable for the elastic vessel to be more rigid proximate the connection to the manifolds than in the center of the vessel to reduce stress risers that may occur at the transitions between flexible and rigid components. Furthermore, the elastic modulus of the vessel may be controlled by how the fibers are woven or joined in the elastic material.

Figure 18:
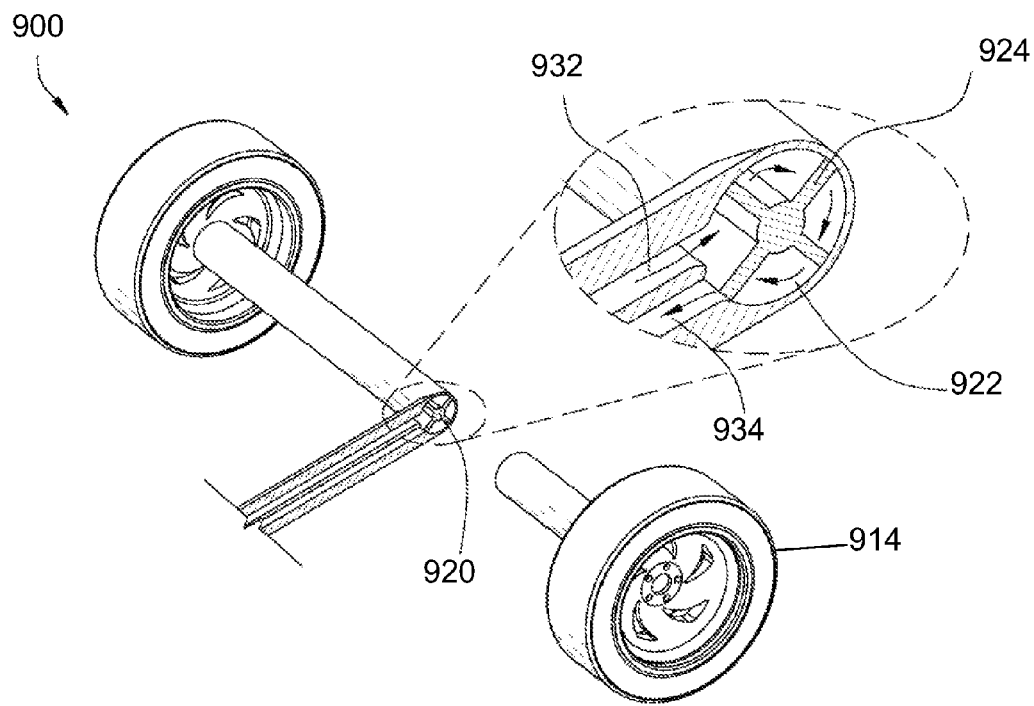
FIG. 18 is a cross-sectional diagram of an embodiment of a rotary mechanism.

The energy storage system may be used to rotate the translation assemblies 914 by turning an axle 920, as in the embodiment 900 of FIG. 18. The axle 920 may be disposed within a chamber 922 and may comprise a rotary mechanism such as a plurality of radially positioned blades 924 such that as a hydraulic fluid enters the chamber 922 from a first connecting fluid pathway 932 and exerts a force on the blades 924 to rotate the axle 920, propelling the vehicle 910 forward. The fluid may then exit through a second connecting fluid pathway 934. The fluid may also enter the chamber 922 from the second pathway 934 and exit through the first pathway 932, causing the axle 920 to rotate in the opposite direction and propel the vehicle in reverse.

Figure 19:
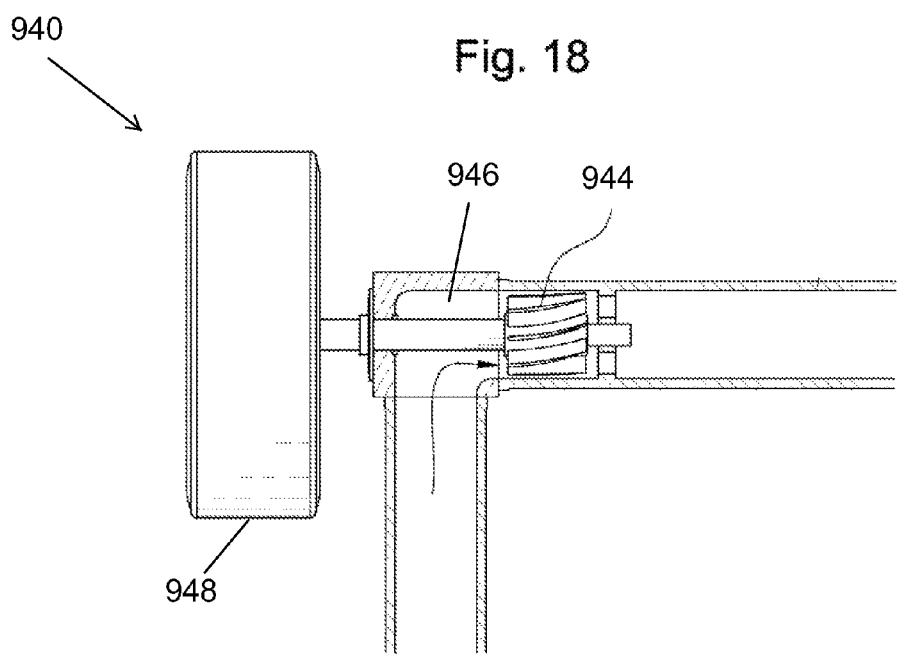
FIG. 19 is a cross-sectional diagram of another embodiment of a rotary mechanism.

In yet another embodiment 940 shown in FIG. 19, the rotary mechanism may comprise a turbine 944 which is connected to the translational element 948 by an axle 946. As the turbine 940 is rotated, its torque is transmitted through the axle 946 to the translational element 948, thereby propelling the vehicle.

Figure 20:
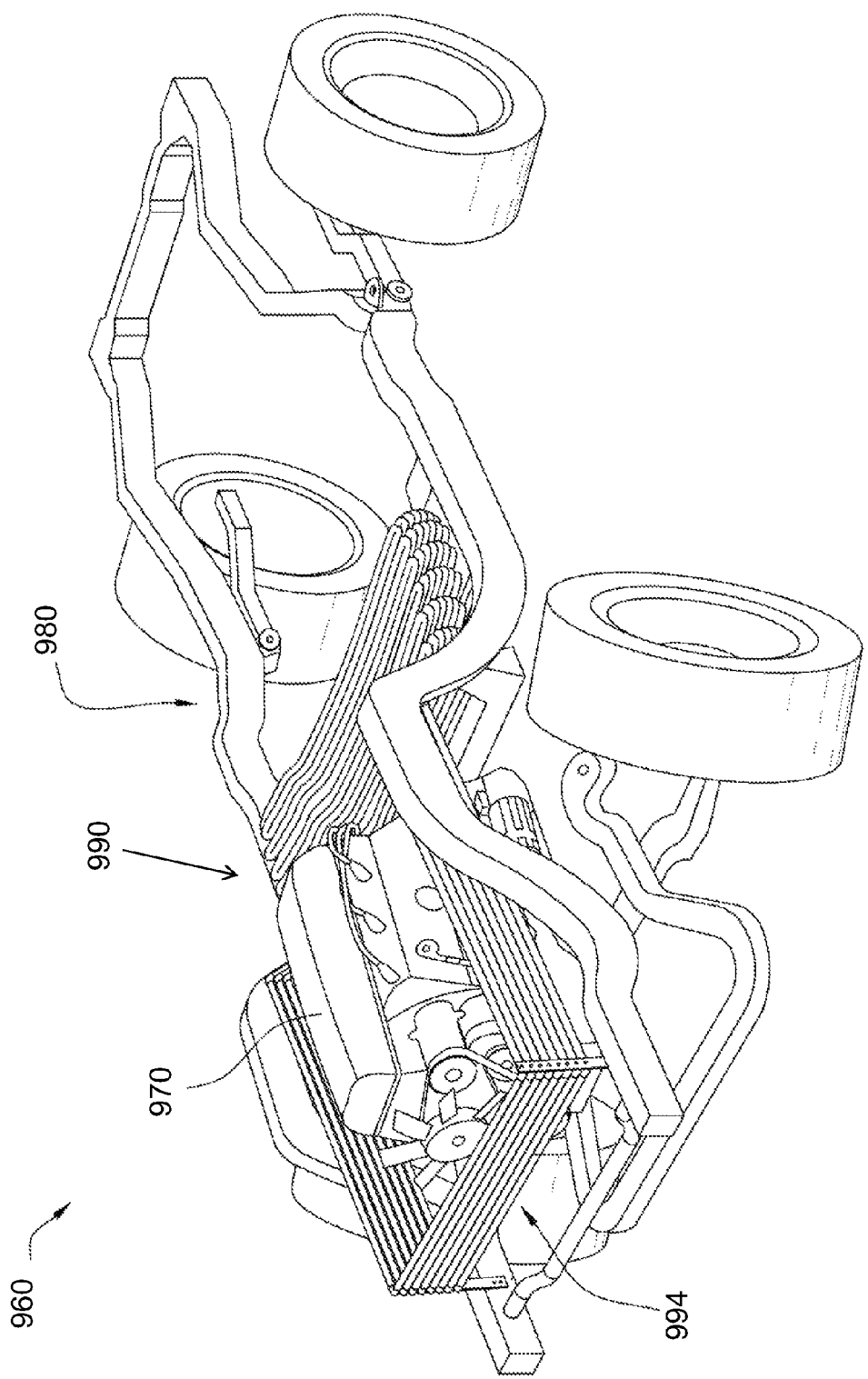
FIG. 20 is a perspective diagram of another embodiment of an energy storage system.

Now referring to the embodiment 960 of FIG. 20, the energy storage system may be incorporated into a vehicle comprising a conventional gas-powered engine 970 and frame 980. The energy storage system may comprise a combination of a bladder and hoses. A portion 994 of the elastic vessel 990, may be positioned proximate the engine 970 for cooling the engine. This embodiment may also be useful to aiding the vehicle in accelerating, when more energy is required such as when the vehicle to going up hill, or both.

FIG. 21 discloses a method 1000 for propelling a translatable vehicle comprising providing 1002 an elastic fluid vessel coupled to the translatable vehicle, the elastic vessel comprising stored potential energy in a form of pressurized fluid expanding a volume of the elastic vessel; the vessel also being in fluid communication with a rotary mechanism adapted to control a rotational speed of a portion of at least one translation assembly of the vehicle; and rotating 1004 the portion of the at least one translation assembly by ejecting pressurized fluid into the rotary mechanism from the elastic fluid vessel. The method may further include the step of automatically roll-starting an engine of the vehicle while the portion of the at least one translation assembly is rotating. The method may also comprise the step of automatically turning off the engine while the rotational speed of the portion of the translation assembly decelerates.

Whereas the present invention has been described in particular relation to the drawings attached hereto, it should be understood that other and further modifications apart from those shown or suggested herein, may be made within the scope and spirit of the present invention.

What is claimed is:

1. A system for storing and delivering energy to an energy conversion device, the system comprising:
   a frame;
   a vessel moveable between a first volume and a second volume larger than the first volume upon receiving a hydraulic fluid at a first pressure, the vessel including a stretchable sidewall configured to urge the hydraulic fluid therefrom, the stretchable sidewall of the vessel also forming a portion of the frame;
   a hydraulic machine mechanically associated with the frame and connectable with the vessel for receiving therefrom the hydraulic fluid at the first pressure, the hydraulic machine being mechanically connectable to the energy conversion device, the hydraulic machine being operable to receive the hydraulic fluid at the first pressure and deliver energy to the energy conversion device; and a reservoir mechanically associated with the frame and connectable with the hydraulic machine to receive therefrom hydraulic fluid at a second pressure that is less than the first pressure.

2. The system of claim 1, wherein the hydraulic machine is operable to receive energy from the energy conversion device to increase the pressure of hydraulic fluid from the reservoir at the second pressure and deliver the hydraulic fluid to the vessel at the first pressure.

3. The system of claim 1, wherein the vessel is a hose.

4. The system of claim 1, wherein a material forming the stretchable sidewall is selected from the group consisting of a composite material polyurethane, polyethylene, aramid fiber, para-aramid fiber, nylon, rubber, carbon, synthetic polymers, chloroprene, elastomers, polyester, carbon fiber and glass fiber.

5. The system of claim 1, wherein the stretchable sidewall is an elastic woven fiber.

6. The system of claim 1, wherein a rigid fluid conduit connectable to the hydraulic machine is disposed within the vessel and configured to contain hydraulic fluid at the second pressure.

7. The system of claim 1, wherein the hydraulic machine comprises a hydraulic motor.

8. The system of claim 7, wherein the hydraulic motor is selected from the group consisting of a cam shaft, a turbine, and a lobed rotor.

9. The system of claim 1, wherein the hydraulic machine comprises a pump.

10. The system of claim 9, wherein the pump is a centrifugal pump.

11. The system of claim 1, wherein the hydraulic fluid is essentially non-compressible.

12. The system of claim 1, wherein the energy conversion device is directly coupled to the hydraulic machine.

13. The system of claim 1, wherein the energy conversion device further comprises a rotatable wheel.

14. The system of claim 13, wherein the hydraulic machine further comprises a plurality of hydraulic motors, with each of the plurality of hydraulic motors being mechanically coupled to one of a plurality of rotatable wheels of a wheeled vehicle.

15. The system of claim 1, wherein the vessel is configured to stiffen the frame when expanded from the first volume to the second volume.

16. The system of claim 1, wherein the first pressure varies with displacement of the stretchable sidewall.

17. The system of claim 1, wherein the stretchable sidewall includes a fibrous material that stretches and urges itself to return to its non-stretched configuration.

18. The system of claim 17, wherein the fibrous material further comprises elastically deformable stretchable fibers.

19. A system for storing and delivering energy to an energy conversion device, said system comprising:

a vessel moveable between a first volume and a second volume larger than said first volume upon receiving a hydraulic fluid at a first pressure, said vessel including:

a first port connectable to receive and discharge said hydraulic fluid at said first pressure;

a stretchable sidewall configured to urge said hydraulic fluid therefrom; and a rigid fluid conduit disposed within said vessel, said rigid fluid conduit having a second port connectable to receive and discharge hydraulic fluid at a second pressure;

a hydraulic machine connectable with said first and second ports for receiving and discharging said hydraulic fluid there through, said hydraulic machine being mechanically connectable to said energy conversion device and operable to receive said hydraulic fluid from said vessel at said first pressure, deliver energy to said energy conversion device, and discharge said hydraulic fluid at said second pressure into said rigid fluid conduit; and a reservoir connectable with said rigid fluid conduit to receive therefrom said hydraulic fluid at said second pressure.

20. The system of claim 19, wherein said hydraulic machine is operable to receive energy from said energy conversion device to increase said pressure of hydraulic fluid from said reservoir at said second pressure and deliver said hydraulic fluid to said vessel at said first pressure.

21. The system of claim 19, wherein said stretchable sidewall of said vessel further comprises a portion of a frame structure supporting said vessel, said hydraulic machine and said reservoir.

22. The system of claim 21, wherein said vessel is configured to stiffen said frame structure when expanded from said first volume to said second volume.

23. The system of claim 19, wherein said first pressure varies with displacement of said stretchable sidewall.

24. The system of claim 19, wherein said energy conversion devices further comprises a rotatable wheel.

25. The system of claim 24, wherein said hydraulic machine further comprises a plurality of hydraulic motors, with each of said plurality of hydraulic motors being mechanically coupled to one of a plurality of rotatable wheels of a wheeled vehicle.

26. A wheeled vehicle, comprising:

a vehicle frame, a plurality of wheels rotatably coupled to and supporting said vehicle frame;

a reservoir mechanically associated with said vehicle frame and configured to receive and supply hydraulic fluid at a second pressure;

a hydraulic machine mechanically associated with said vehicle frame and connectable to said reservoir to supply thereto said hydraulic fluid at said second pressure, said hydraulic machine being connectable to said plurality of wheels and operable to receive hydraulic fluid at a first pressure that is higher than said second pressure and deliver energy to said plurality of wheels; and a hydraulic fluid storage device connectable to said hydraulic machine and operable to supply said hydraulic fluid to said hydraulic machine at said first pressure, said hydraulic fluid storage device being moveable from a first volume to a second volume larger than said first volume upon receiving said hydraulic fluid at said first pressure, said hydraulic fluid storage device having a stretchable sidewall forming a portion of said vehicle frame and configured to urge hydraulic fluid therefrom.

27. The wheeled vehicle of claim 26, wherein said hydraulic machine is operable to receive energy from said energy conversion device to increase said pressure of hydraulic fluid from said reservoir at said second pressure and deliver said hydraulic fluid to said vessel at said first pressure.

28. The wheeled vehicle of claim 27, wherein said hydraulic machine is operable to extract a braking energy from said plurality of wheels to deliver said hydraulic fluid at said first pressure to said hydraulic fluid storage device.

29. The wheeled vehicle of claim 26, wherein said hydraulic fluid storage device is configured to stiffen said vehicle frame when expanded from said first volume to said second volume.

30. The wheeled vehicle of claim 26, wherein said first pressure varies with displacement of said stretchable sidewall.

31. The wheeled vehicle of claim 26, wherein said hydraulic machine further comprises a plurality of hydraulic motors, with each of said plurality of hydraulic motors being mechanically coupled to one of said plurality of rotatable wheels of said wheeled vehicle.

\* \* \* \* \*